United States Patent [19]

Eisendrath

[11] Patent Number: 4,462,306
[45] Date of Patent: Jul. 31, 1984

[54] ADJUSTABLE COOKING GRILL

[76] Inventor: Charles R. Eisendrath, 1211 Ferdon Rd., Ann Arbor, Mich. 48104

[21] Appl. No.: 363,604

[22] Filed: Mar. 30, 1982

[51] Int. Cl.³ .............................................. A47J 37/04
[52] U.S. Cl. ...................................... 99/340; 99/446; 99/447; 99/421 HV; 126/25 A; 126/41 E; 126/41 B
[58] Field of Search ..................... 99/446, 447, 421 H, 99/421 HV, 421 HH, 393, 340; 126/41 E, 41 B, 22, 141, 25 A, 25 AA, 338

[56] References Cited

U.S. PATENT DOCUMENTS

| | | | |
|---|---|---|---|
| 1,853,319 | 4/1932 | Polhemus | 126/41 E |
| 2,180,868 | 11/1939 | Dunning et al. | 99/446 |
| 2,472,164 | 6/1949 | Mannheimer | 99/421 H |
| 2,691,368 | 10/1954 | Hood | 126/25 A |
| 2,715,870 | 8/1955 | Rutkowski | 99/421 HV |
| 2,815,707 | 12/1957 | Morrow | 99/421 HH |
| 3,308,747 | 3/1967 | Spagnolo | 99/446 |
| 3,435,754 | 4/1969 | Löhr et al. | 99/447 X |
| 4,043,260 | 8/1977 | La Pour et al. | 99/421 HV X |

FOREIGN PATENT DOCUMENTS

| | | | |
|---|---|---|---|
| 2435801 | 2/1976 | Fed. Rep. of Germany | 99/446 |
| 1331397 | 4/1963 | France | 99/421 HV |
| 844861 | 8/1960 | United Kingdom | 99/421 HV |

Primary Examiner—Billy J. Wilhite
Assistant Examiner—Christine A. Peterson
Attorney, Agent, or Firm—Barnes, Kisselle, Raisch, Choate, Whittemore & Hulbert

[57] ABSTRACT

An outdoor cooking grill having a bottom grate supported in an iron framework with a food grill of parallel heat conductive bars capable of being raised and lowered relative to the grate. The apparatus includes a curved heat reflective back plate providing insulative characteristics to protect the back closure. Rotisserie supports are provided on a horizontal lift support frame which can serve selectively as a grill support and a rotisserie support. Specific lock devices are provided for rotisserie rods to position the rods in any of a plurality of positions. A composite lift bracket serves also as a rotisserie support.

5 Claims, 12 Drawing Figures

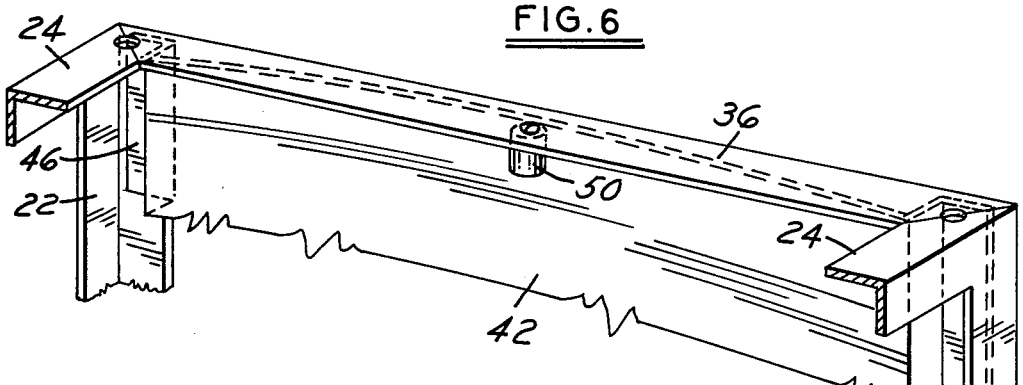
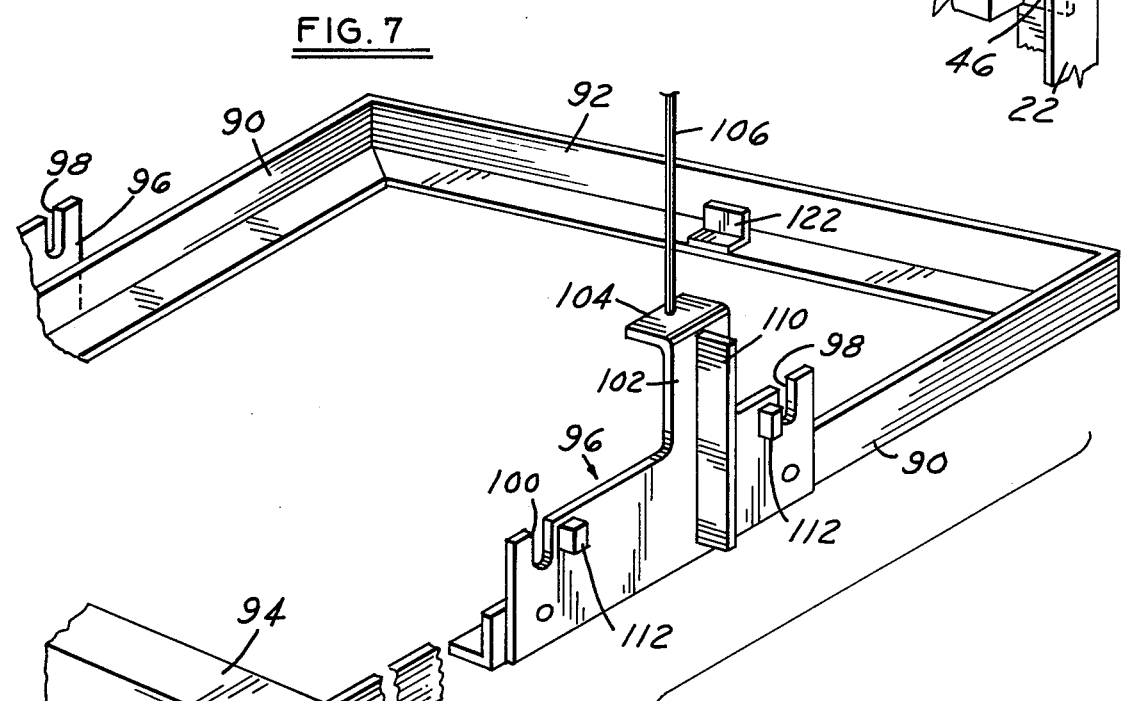
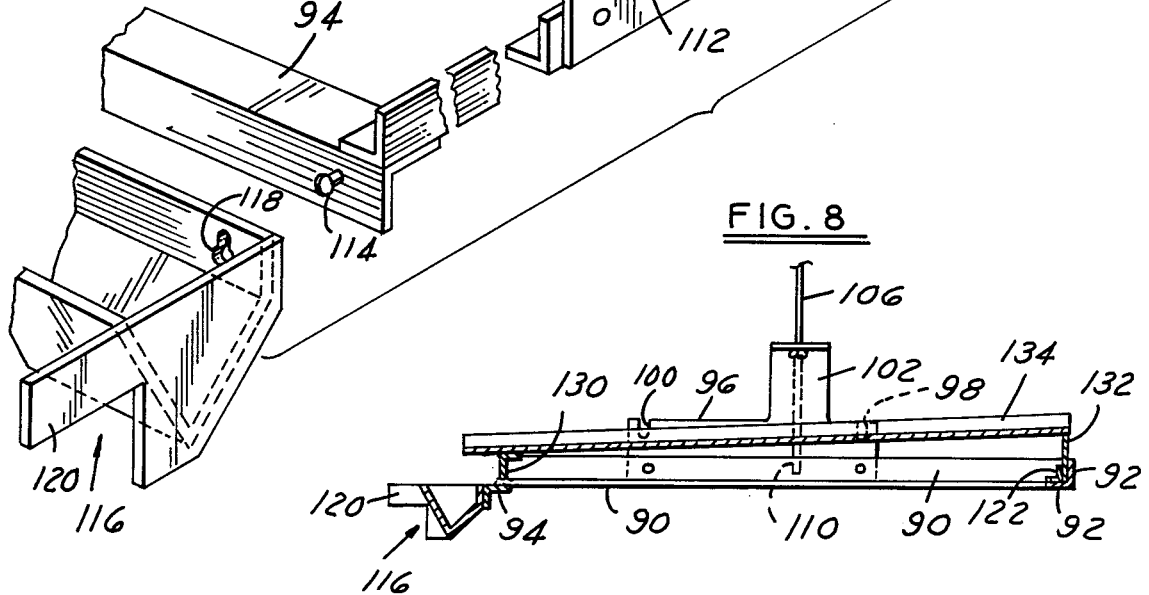

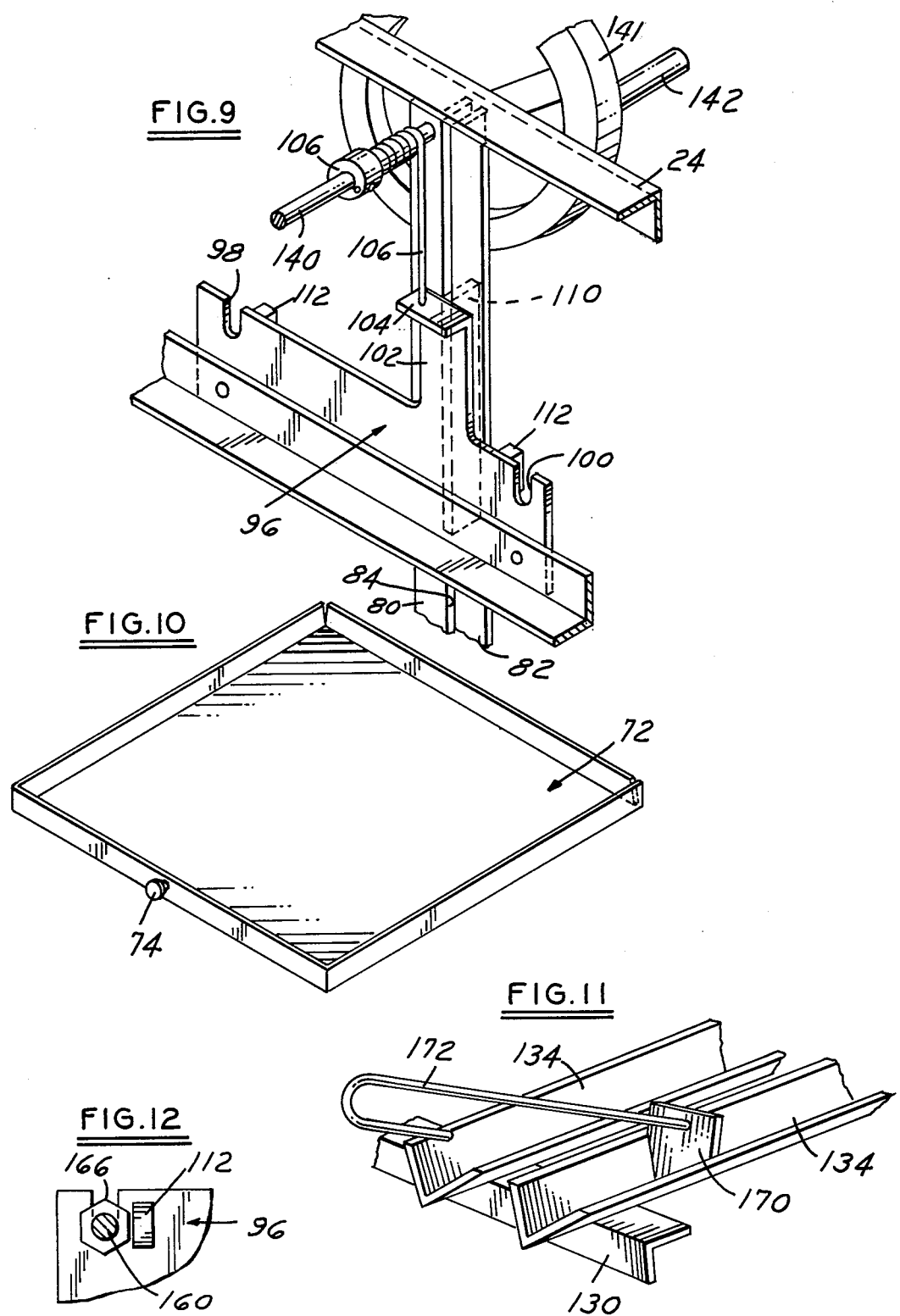

ADJUSTABLE COOKING GRILL

FIELD OF INVENTION

The invention relates to improvements in open flame cooking grills utilizing wood and charcoal fuel.

BACKGROUND OF THE INVENTION

1. Prior Art

Iron framework grills for open flame outdoor cooking are known of the type having a bottom rack for supporting burning fuel, such as wood or charcoal, and having a vertically movable grill supported in the framework for movement up and down in the framework with the aid of a crank operated shaft. The grill comprises a plurality of parallel food supports, angled to horizontal, which serve as grease drains for the food supported on the grill. A rotisserie shaft can be used in the framework.

OBJECTS AND FEATURES OF THIS INVENTION

The present invention comprises improvements on the prior art structure which includes a framework with horizontal food support frame guided for vertical movement in the framework, and also adjustable by a heavy inertia wheel operating a hoisting and lowering shaft. A removable food support grill on the horizontal frame is arranged to have an incline toward a frontal drip trough and is formed of aluminum V-channels to transmit heat to the supported food. The horizontal support frame can be used selectively, upon removal of the grills for supporting rotisserie shafts which will be rotatable to interlocked positions and movable toward and away from a bottom fire rack by the vertical movement of the food support frame.

An air insulation chamber is provided at the back of the grill by a double wall, the inner wall being curved to form a heat reflector which directs heat to the center of the heating chamber above a removable fire support rack at the bottom of the device.

Objects and features of the invention will be apparent in the following description and claims in which the invention is described together with details to enable a person skilled in the art to practice the invention.

BRIEF DESCRIPTION OF THE DRAWINGS

DRAWINGS accompany the invention and the various views thereof may be briefly described as:

FIG. 6, a segmental perspective view of the upper rear of the device.

FIG. 7, a perspective view of the horizontal support frame;

FIG. 8, a sectional view from front to back of the support frame and food grill;

FIG. 9, a fragmentary view showing the lift and slide mechanism;

FIG. 10, a view of an ash drawer;

FIG. 11, a view of a customized scraper for the grill;

FIG. 12, a view of a rotisserie lock.

DETAILED DESCRIPTION OF THE INVENTION AND THE MANNER AND PROCESS OF USING IT

Figure 1:
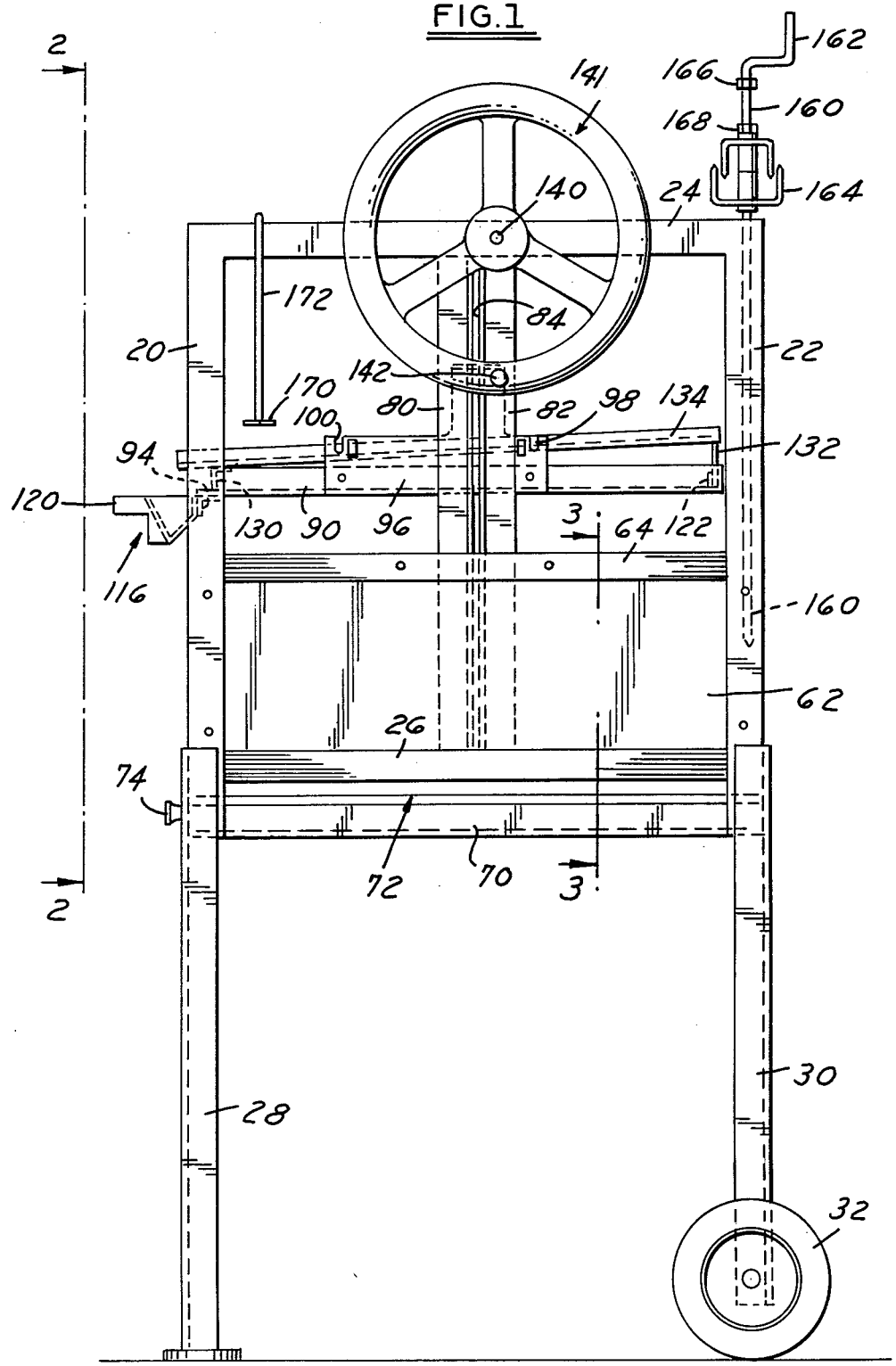
FIG. 1, a side view of the apparatus.

In FIG. 1, a side view of the grill assembly is shown. A rectangular side frame having front and rear angles (angle iron lengths) 20, 22 and top and bottom angles 24, 26 is supported by fore and aft legs 28, 30 suitably bolted to the frame. The rear legs 30 have a wheel 32 journalled at the bottom to facilitate moving of the device. A similar side frame is disposed on the other side of the grill assembly and these two side frames are connected at the front by horizontal angles 34 at the bottom and top and at the rear by angles 36. Thus, the upper rectangular frames actually form a cubic enclosure.

Figure 4:
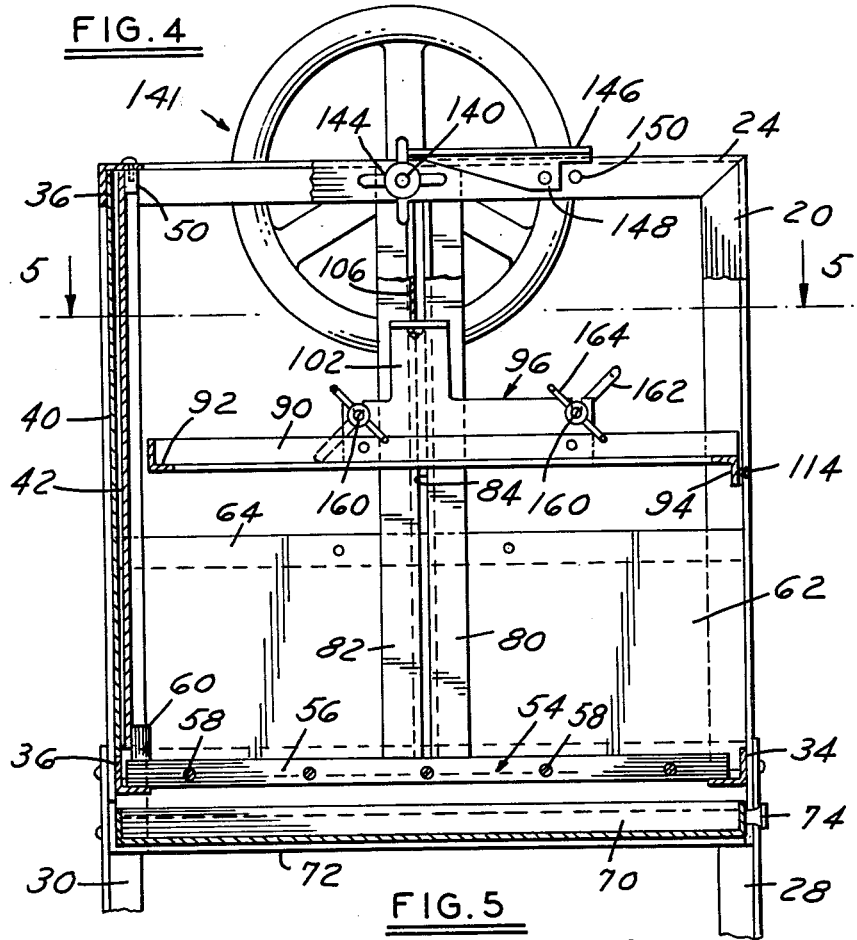
FIG. 4, a view partially in section, taken on line 4—4 of FIG. 2.

The rectangular frame at the rear of the unit, formed by uprights 22 and cross angles 36, is closed by a metal sheet 40 exposed at the back of the unit. See FIGS. 4 and 5. A second baffle sheet 42, preferably formed of aluminum, is mounted on uprights 22 at the sides and riveted in place along with sheet 40. This second sheet 42 has a flanged edge with a return portion 44 and a side flange 46 which spaces the sheet 42 outwardly from the back sheet about ½ to ⅜ of an inch. This forms an air space which insulates the back sheet from direct heat of the fire and thus prevents buckling of the back sheet.

Figure 5:
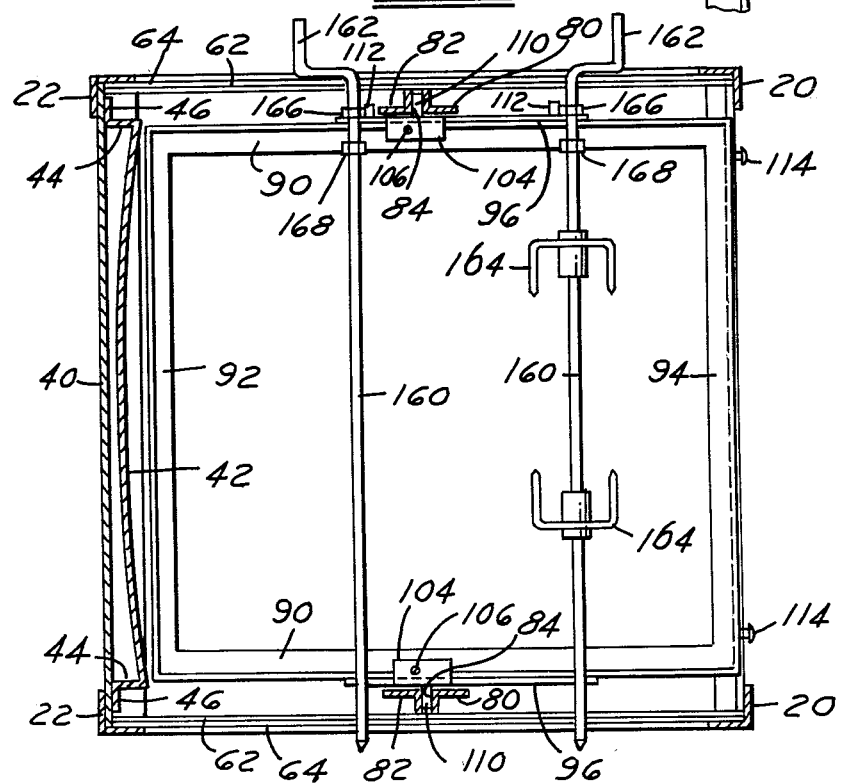
FIG. 5, a section on line 5—5 of FIG. 4 showing rotisserie rods.

The second baffle 42, as shown in FIG. 5, has a concave curve. As illustrated in FIG. 6, this sheet is maintained in this curved position at the top by a pin 50. Pressure from a tab (later to be described) on the fire grate will cause this same curvature at the bottom. This curvature, together with the flanged edges, allows the baffle sheet 42 to expand and contract without distorting the frame and also provides a deflector function reflecting the heat of the grill toward the center of the cubic enclosure.

Figure 3:
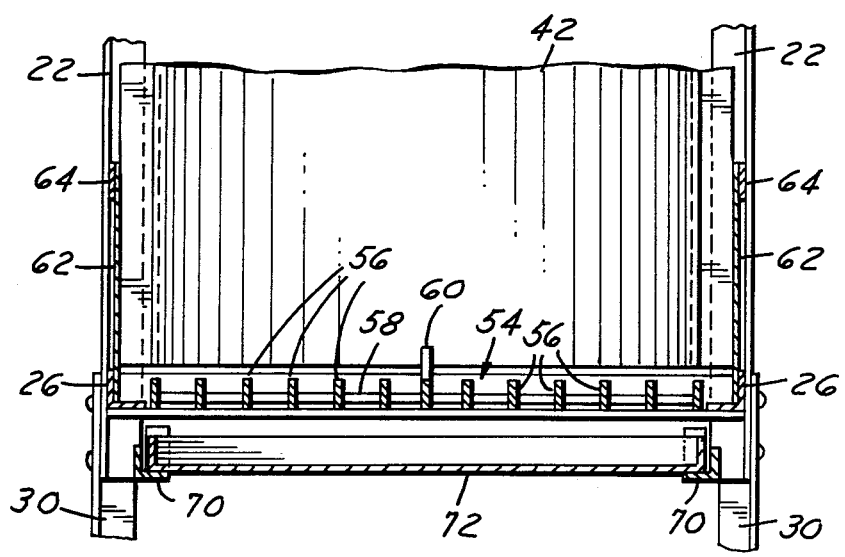
FIG. 3, a sectional view on line 3—3 of FIG. 1.

A fire grate 54 formed of spaced iron strips 56 (FIG. 3) welded to suitable cross-strips 58, rests on the rectangular frame at the bottom of the cubic frame formed by angles 26, 34, 36. This fire grate is removable from the frame and has sufficient clearance that any expansion due to the heat to which it is subjected will not distort the frame. An upstanding tab 60 on the middle strip of the grate bears against the bottom of plate 42 to hold in the described convex position when the grate is in place.

Two deflector side plates 62, preferably of aluminum, are disposed at the bottom of each of the side rectangles of the frame. A cross-strip 64 reinforces these plates at the top edge.

Below the supported grate 54 at each side of the unit are angles 70 turned inwardly to provide slides for a flat ash tray 72 shown in perspective in FIG. 10. The tray may be readily removed by handle 74.

On each side of the cubic frame, centrally and vertically disposed between upper and lower side frame members, are two angles 80, 82 spaced to form a vertical guide slot 84. Reference is now made to the fragmentary perspective view in FIG. 7 where there is shown a rectangular grill support frame with side members 90, a rear cross piece 92, and a front cross piece 94. The side and rear pieces are positioned as an upright L. The front piece 94 is inverted. On each side piece 90 a bracket 96 is riveted having a horizontal section extending above the side angles and notched fore and aft at 98 and 100. A vertical extension 102 has an inturned tab 104 to which can be fastened the end of a cable 106.

Figure 2:
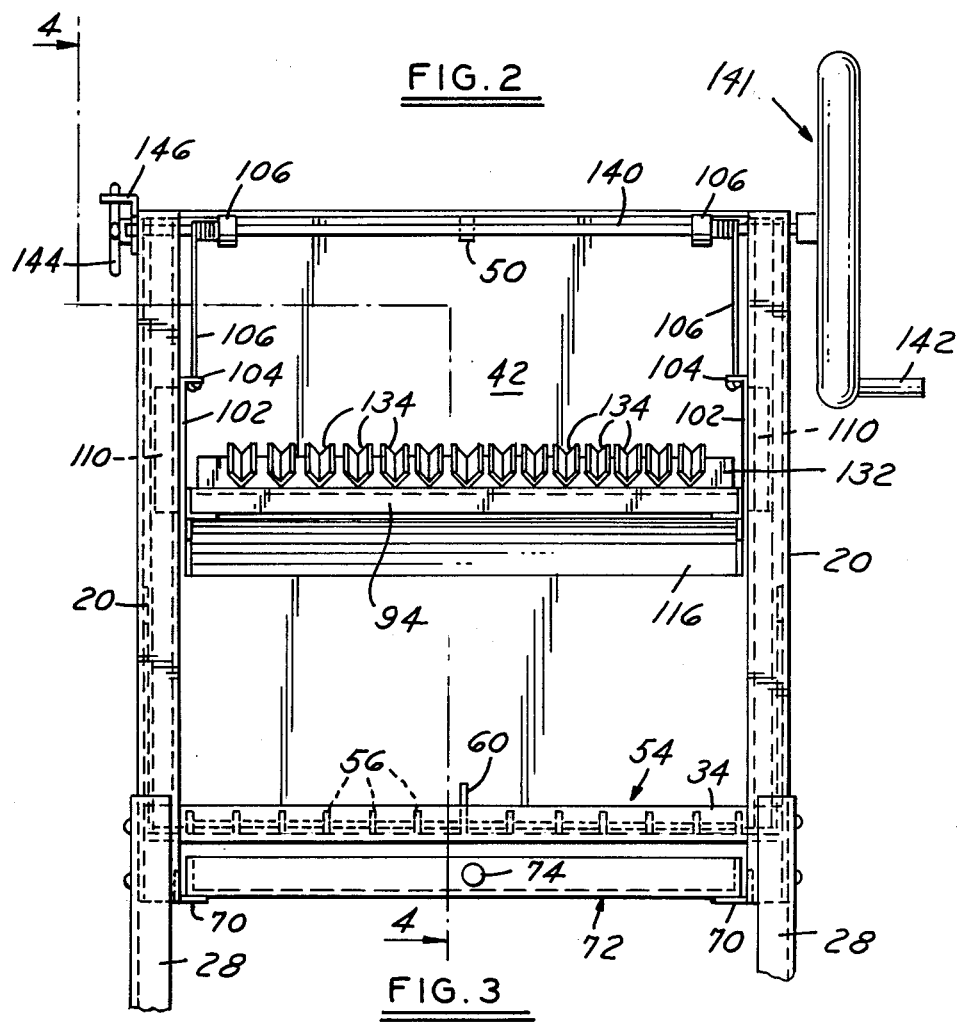
FIG. 2, a front view of the device on line 2—2 of FIG. 1.

Extending outwardly of each bracket is a guide bar 110 dimensioned to have a sliding fit in guide slot 84. Lugs 112 are welded adjacent notches 98 and 100 to serve as rotisserie locks as will be explained. Headed rivets 114 are provided on the front flange of angle 94 to support a grease drip trough 116 (FIGS. 1, 2, and 7). A back plate on the trough 116 has bayonet slots 118 which cooperate with rivets 114 to removably support the trough on front angle 94. Handle projections 120 serve to aid in the installation and removal of the trough. On the back angle 92 of the grill support frame is an L-shaped piece 122, one leg of which is welded to angle 92 and the upstanding leg of which is spaced from the back run of angle 92. This leg serves as a positioner for a grill frame to be described.

The food grill for supporting food to be cooked or warmed in the assembly is shown in front elevation in FIG. 1, a sectional view on FIG. 8, and fragmentary perspective in FIG. 11. This food grill has a front cross angle bar 130, a rear cross plate 132, vertically disposed, and a plurality of V-shaped grill bars 134 welded to the elements 130, 132. These grill bars are preferably formed of a high grade aluminum which has a rapid heat transfer characteristic. The grill bars are angled downwardly from back to front because the back support plate 132 has a vertical dimension about twice that of front angle piece 130.

This food grill is supported on the grill support frame member 92 by the plate 132 at the rear which lodges behind the upstanding leg of piece 122. The front bar 130 of the food grill is supported on the front ends of side member 90 of the grill support frame. Since the grill support frame is always in a horizontal position, the food grill will always be in an angled position and the foreward ends of the V-shaped grill bars 134 overlie the collection trough 116.

Cables 106 have been mentioned in connection with tabs 104 on the side brackets 96 of the grill support frame. As shown in FIGS. 2 and 9, the cables 106 extend up to a rotating shaft 140 journalled at the top of the spaced side plates 80, 82 and in cross frame members 24. The cable wraps around the shaft a sufficient number of turns to obtain the desired lower and raise range and are locked at one end by the rings 106. A relatively heavy cast wheel 141 weighing about three pounds is mounted on one extending end of shaft 140 with an extending handle 142. The other end of the shaft 140 extends out of the frame to mount a ratchet wheel 144 which operates in conjunction with a lift ratchet 146 pivoted at 148. A stop pin 150 (FIG. 4) permits only limited release of the latch so it is always gravity actuated to a latching position. It may be manually lifted to a release position which will permit rotating of the wheel 141 and the shaft 140 in a direction to lower cables 106 and the grill support frame. Rotation of the wheel and shaft in the other direction will cause the ratchet wheel 144 intermittently to raise the latch as the frame is lifted to the position desired. The inertia of the heavy wheel aids in the control of the grill support frame and food grill in the raising and lowering operation.

Thus, it will be seen that the grill frame supports the grate rack 54 at the bottom on which a fire may be built of wood or charcoal. The grill support frame can be positioned in the proper position to support the food grill at a desired level from the fire and the food may be cooked a prescribed time until ready for consumption.

It will be appreciated that the food grill is removable from the support frame. Rotisserie rods 160 can then be supported in the notches 98 and 100 of bracket 96 as shown in FIG. 5. The rods have crank handles 162 and suitable clutch pins 164 to engage the food whether it be a roast or a poultry unit. The rotisserie rods may be lifted and lowered with the support frame as previously described. The rotisserie rods carry a multi-sided piece such as a hexagonal nut 166 which may engage lug 112 (FIG. 12) to prevent rotation of the rod. When the rod is moved axially so that nut 166 clears the lug, the rod can be turned. A second nut 168 is positioned to prevent the degree of movement of the rod which would dislodge the opposite end. The hexagonal nut allows the rotisserie rod to be locked rotatively in any of six different positions so that food may be progressively cooked as the rod is shifted from one rotative position to another.

In FIG. 11, a special scraper 170 with a handle 172 is illustrated. This scraper is shaped to fit the V-bars of the food grill to assist in the clearing. This unit, as well as the rotisserie rods, can be stored in the framework as shown in FIG. 1.

What is claimed is:

1. In a grill assembly having a framework support and a vertically movable food grill to be positioned at various levels in a cooking area above a fire grate and having a front side and a rear side, that improvement which comprises:
   (a) a horizontal support frame movable to various vertical positions relative to a fire grate by remote manually operable means including hoist cables secured at each end to said frame,
   (b) slot guide means on said framework support located between said front and rear sides,
   (c) means on said support frame slidably engageable with said slot means to guide said support frame for vertical movement relative to said framework support, and
   (d) a food support grill removably supported on said horizontal support frame independent of said slot guide means,
   (e) the means on said support frame comprising a bracket on each side of said support frame which includes a vertical guide for said frame cooperable with said slot guide means, an anchor point for a hoist cable on each said bracket, a rotisserie support on said bracket fore and aft of said vertical guide, and rotisserie rods mountable at each end in said brackets for utilization when said food support grill is removed from said horizontal support frame.

2. A grill assembly as defined in claim 1 in which the rear side of said grill assembly is closed by a flat sheet of metal on the outside and a second sheet of metal on the inside of said outside sheet coextensive vertically and horizontally with the cooking area, said second sheet being rearwardly flanged at vertical side edges to space the edges of the second sheet forward of the first sheet, and means to hold said second sheet in a concave position on a vertical axis to provide a heat reflector in said cooking area.

3. In a grill assembly having a framework support and a vertically movable food grill to be positioned at various levels above a fire grate and having a front side and rear side, that improvement which comprises:
   (a) a horizontal support frame movable to various vertical positions relative to a fire grate and a food grill mountable on said frame having a rear support higher than a front support to position said grill on said frame with a drain angle toward the front side of the unit, (b) the rear side of said grill being closed by a flat sheet of metal on the outside and a second sheet of metal on the inside, said second sheet of metal being flanged at side edges to space the second sheet forward to the first sheet, (c) means to hold said second sheet in a concave position on a vertical axis to provide a heat reflector comprising a pin in the frame work support at the top of said second sheet, (d) a fire grate removably positioned in said framework support with said side and end clearance to allow expansion without distortion of said framework, and (e) an upright tab on the rear of said grate to bear against said second sheet to force it into a concave contoured position.

4. A grill assembly as defined in claim 1, in which the remote manually operable means for raising and lowering the horizontal support frame comprises a rotating shaft mounted at the top of said framework support, cable means extending from said shaft to each end of said horizontal support frame, latch means to limit the motion of said shaft in a lowering direction, and a heavy manipulating inertia wheel at one end of said shaft weighing about three pounds to allow an operator to control the rotary position of said shaft.

5. A grill assembly as defined in claim 1 in which a rotisserie rod is supported horizontally at each end on said spaced opposed brackets and movable longitudinally in a limited motion from a lock to a non-lock position and a rotation lock on one of said spaced brackets and on one end of said rotisserie rod to block rotation of said rod in one longitudinal position and permit rotation in a second longitudinal position, said rod having a portion extending outside said framework support and said horizontal support frame to facilitate longitudinal manipulation of said rod, and means on said rod adjacent said one bracket and means on said one bracket to limit the axial movement of said rod from a longitudinal lock position to a longitudinal unlock position to prevent accidental withdrawal of the other end of said rod from the other of said spaced brackets.

* * * * *